US005514362A

United States Patent [19]

Miller

[11] Patent Number: 5,514,362
[45] Date of Patent: May 7, 1996

[54] PREPARATION OF NON-ZEOLITIC MOLECULAR SIEVES

[75] Inventor: Stephen J. Miller, San Francisco, Calif.

[73] Assignee: Chevron U.S.A. Inc., San Francisco, Calif.

[21] Appl. No.: 237,089

[22] Filed: May 3, 1994

[51] Int. Cl.⁶ .......................... C01B 37/04; C01B 37/06; C01B 37/08
[52] U.S. Cl. .......................... 423/702; 423/705; 423/712; 423/DIG. 30; 502/208; 502/214
[58] Field of Search ................... 423/702, 712, 423/705, DIG. 30; 502/208, 214

[56] References Cited

U.S. PATENT DOCUMENTS

| | | | |
|---|---|---|---|
| 3,226,339 | 12/1965 | Frilette et al. | 502/74 |
| 3,236,761 | 2/1966 | Rabo et al. | 502/74 |
| 3,236,762 | 2/1966 | Rabo et al. | 208/111 |
| 3,373,109 | 3/1968 | Frilette et al. | 502/74 |
| 3,620,960 | 11/1971 | Kozlowski et al. | 208/60 |
| 4,202,996 | 5/1980 | Hilfman | 585/377 |
| 4,310,440 | 1/1982 | Wilson et al. | 502/208 |
| 4,440,871 | 4/1984 | Lok et al. | 502/214 |
| 4,567,029 | 1/1986 | Wilson et al. | 423/306 |
| 4,686,093 | 8/1987 | Flanigen et al. | 423/306 |
| 4,710,485 | 12/1987 | Miller | 502/213 |
| 4,778,780 | 10/1988 | Valyocsik et al. | 502/208 |
| 4,793,984 | 12/1988 | Lok et al. | 423/DIG. 30 |
| 4,913,795 | 4/1990 | Valyocsik | 423/708 |
| 4,913,796 | 4/1990 | Valyocsik | 423/708 |
| 4,913,799 | 4/1990 | Gortsema et al. | 208/89 |
| 4,943,424 | 7/1990 | Miller | 423/708 |
| 4,973,785 | 11/1990 | Lok et al. | 585/481 |
| 5,087,347 | 2/1992 | Miller | 208/46 |
| 5,124,136 | 6/1992 | Davis | 502/208 |
| 5,208,005 | 5/1993 | Miller | 423/702 |
| 5,230,881 | 7/1993 | Miller | 423/705 |
| 5,232,683 | 8/1993 | Clark et al. | 423/708 |

FOREIGN PATENT DOCUMENTS

| | | | |
|---|---|---|---|
| 425029 | 5/1991 | European Pat. Off. | 502/208 |
| 2149409 | 6/1990 | Japan | 502/208 |

*Primary Examiner*—Karl Group
*Assistant Examiner*—David Sample
*Attorney, Agent, or Firm*—R. J. Sheridan

[57] ABSTRACT

A process is disclosed for preparing a non-zeolitic molecular sieve from a dense gel containing sufficient liquid that the dense gel may be formed into self-supporting particles if desired prior to crystallization. In the process, the dense gel, which is optionally in the form of particles, is heated at crystallization conditions and in the absence of an external liquid phase, so that excess liquid need not be removed at the conclusion of the crystallization step.

32 Claims, No Drawings

PREPARATION OF NON-ZEOLITIC MOLECULAR SIEVES

BACKGROUND OF THE INVENTION

This invention relates to a method of crystallizing an aluminophosphate molecular sieve within particles. Molecular sieves belong to a commercially important class of crystalline materials. They have distinct crystal frameworks with ordered pore structures which are demonstrated by distinct X-ray diffraction patterns. The crystal structure defines cavities and pores which are characteristic of the different species. Natural and synthetic crystalline molecular sieves are useful as catalysts and adsorbents. The adsorptive and catalytic properties of each molecular sieve are determined in part by the dimensions of its pores and cavities. Thus, the utility of a particular molecular sieve in a particular application depends at least partly on its crystal structure. Because of their unique sieving characteristics, as well as their catalytic properties, molecular sieves are especially useful in such applications as gas drying and separation and hydrocarbon conversion. The term "molecular sieve" refers to a material prepared according to the present invention having a fixed, open-network structure, usually crystalline, that may be used to separate hydrocarbons or other mixtures by selective occlusion of one or more of the constituents, or may be used as a catalyst in a catalytic conversion process.

The molecular sieve prepared according to the present method belongs to the family of crystalline aluminophosphates comprising $[AlO_2]$ and $[PO_2]$ oxide units in tetrahedral coordination which possess physical and chemical properties as molecular sieves. In addition to the $[AlO_2]$ and $[PO_2]$ oxide units described above, the molecular sieve of the present process may also contain one or more optional elements other than alumina and phosphorous, where each optional element is also capable of forming oxide units in the crystalline framework of the aluminophosphate.

The method of this invention is also directed to a process for preparing a class of molecular sieves known as non-zeolitic molecular sieves, as defined in U.S. Pat. No. 4,913,799, the disclosure of which, and in particular that disclosure relating to the description of specific non-zeolitic molecular sieves and to their preparation, is incorporated herein by reference. As used herein, the term "non-zeolitic molecular sieve" and its abbreviation "NZMS" will be used interchangeably.

Non-zeolitic molecular sieves are conventionally prepared by crystallization from liquid solutions. Conventional methods for preparing aluminophosphate-containing molecular sieves are taught, for example, in U.S. Pat. Nos. 4,310,440; 4,440,871; 4,567,029; 4,686,093; 4,913,799 and 4,973,785. Crystallizing a non-zeolitic molecular sieve from such a liquid solution typically produces finely divided crystals which must be separated from the liquid in which the molecular sieve is crystallized. The separated liquid, in turn, contains substantial concentrations of dissolved reactants, and must be treated for reuse or else be discarded, with potentially deleterious environmental consequences. The dissolved reactants also pose a significant cost for recovery or disposal. Preparing commercially useful catalytic materials using the conventionally prepared molecular sieve also normally requires additional binding and forming steps. Typically, the molecular sieve powder as conventionally prepared must be mixed with a binder material and then formed into shaped particles, using methods such as extrusion. These binding and forming steps greatly increase the complexity of preparing the non-zeolitic molecular sieve as a catalyst. The additional steps may also have an adverse effect on the catalytic performance of the molecular sieve so bound and formed.

The process of the present invention for preparing a non-zeolitic molecular sieve, which process overcomes the inefficiencies of the multiple step conventional preparation process, provides a method for forming the molecular sieve crystals within particles.

SUMMARY OF THE INVENTION

Accordingly, a process is provided for preparing a non-zeolitic molecular sieve from a reaction mixture comprising self-supporting particles wherein the particles comprise active sources of the molecular sieve. More specifically, the present process comprises producing particles comprising at least one active source of phosphorous, at least one active source of alumina, an organic templating agent capable of forming the molecular sieve and sufficient water to make the particles; and maintaining the particles at crystallization conditions for sufficient time to form a crystallized product comprising crystals of the molecular sieve.

In another embodiment of the invention, a process is provided for preparing a non-zeolitic molecular sieve, wherein the process comprises producing a dense gel comprising at least one active source of phosphorous, at least one active source of alumina, an organic templating agent capable of forming the molecular sieve and water; and maintaining the dense gel at crystallized conditions for sufficient time to form a crystallized product comprising crystals of the molecular sieve. In one embodiment of the invention, the dense gel comprises sufficient water to form the dense gel into particles. In a separate embodiment, the ratio of components of the dense gel prior to crystallization is such that the dense gel is capable of being formed into a shape, and capable of maintaining that shape. The dense gel has a preferred molar composition of oxides falling within the following ranges:

|  | Preferred | More Preferred |
|---|---|---|
| $H_2O/Al_2O_3$ | 0.5–8 | 1–6 |
| $P_2O_5/Al_2O_3$ | 0.1–1.1 | 0.5–1.0 |
| $R/Al_2O_3$ | 0.1–2.0 | 0.1–1.5 |
| $M/Al_2O_3$ | 0–1 | 0–0.7 | wherein "R" is an organic templating agent and "M" represents at least one element, other than aluminum and phosphorous, which is capable of forming an oxide in tetrahedral coordination with $[AlO_2]$ and $[PO_2]$ oxide structural units in the molecular sieve, and wherein the total water includes, for example, water present in hydrated sources, water present in added aqueous solutions, and liquid water added to facilitate mixing, shaping and/or crystallization.

Optionally, the dense gel may be formed into particles prior to crystallization. In this optional embodiment, the non-zeolitic molecular sieve is prepared by producing a dense gel comprising at least one active source of phosphorous, at least one active source of alumina, an organic templating agent capable of forming the molecular sieve and water; forming the dense gel into particles; and maintaining the particles at crystallized conditions for sufficient time to form a crystallized product comprising crystals of the molecular sieve.

The non-zeolitic molecular sieve is a molecular sieve having a three-dimensional microporous crystalline framework structure comprising [AlO$_2$] and [PO$_2$] oxide units. The non-zeolitic molecular sieve may optionally contain silicon and/or one or more metals other than aluminum which will form oxide linkages in tetrahedral coordinates with the aluminum and phosphorous in a crystalline framework.

Among other factors, my invention is based on the discovery of a process for crystallizing a non-zeolitic molecular sieve within particles containing an amount of liquid which is sufficient to form the particles, but not sufficient to form a fluid mixture of the active sources of the molecular sieve. This amount of water is considerably less than the amount of liquid generally employed in conventional processes.

Crystallizing the molecular sieve within particles using the present process has several advantages, including simplifying recovery of the crystals following crystallization, and reducing the number of steps necessary to form catalytically useful materials containing the molecular sieve. The particles produced in the preparation of the molecular sieve are easily handled. The amount of liquid which must be removed and reused or recycled following crystallization of the molecular sieve is eliminated or significantly reduced. The molecular sieve may be prepared as a self-bonded particle without added binder in the present process. The molecular sieve crystallites formed in the present process are smaller than those generally formed in the conventional processes. The amount of templating agent required to form the molecular sieve in the present process is typically less than that required in conventional processes. Yields of recoverable molecular sieve crystals, based on the amount of reagents used, are higher that those recovered in the conventional processes, and raw material costs are reduced.

DETAILED DESCRIPTION OF THE INVENTION

As used herein, the term "non-zeolitic molecular sieve", and its abbreviation "NZMS" refers to a molecular sieve having a three-dimensional microporous crystalline framework structure comprising [AlO$_2$] and [PO$_2$] oxide units. Both terms will be considered synonymous terms and will be used interchangeably. The non-zeolitic molecular sieve prepared in the present process may optionally contain silicon and/or one or more metals other than aluminum which will form oxide linkages in tetrahedral coordinates with the aluminum and phosphorous in a crystalline framework.

Thus, in the broadest embodiment, the non-zeolitic molecular sieve prepared in the present process comprises tetrahedrally-coordinated [AlO$_2$] and [PO$_2$] units. Examples include aluminophosphate molecular sieves having a chemical composition, in oxide mole ratios, of Al$_2$O$_3$:1.0±0.2 P$_2$O$_5$. Aluminophosphate molecular sieves of this type are described in, for example, U.S. Pat. No. 4,310,440, the disclosure of which is incorporated totally herein by reference.

Optionally, silicon and/or elements other than aluminum, which form oxides in tetrahedral coordination with [AlO$_2$] and [PO$_2$] units, may also be included. For example, silicoaluminophosphate molecular sieves comprising tetrahedrally-coordinated [AlO$_2$], [PO$_2$], and [SiO$_2$] structural units are disclosed in U.S. Pat. No. 4,440,871, U.S. Pat. No. 4,943,424, and U.S. Pat. No. 5,087,347, the disclosures of which are incorporated totally herein by reference.

In yet another embodiment, the process of this invention relates to the preparation of a non-zeolitic molecular sieve comprising [M$_1$O$_2$], [AlO$_2$], and [PO$_2$] tetrahedrally-bound structural oxide units, where "M$^1$" represents at least one element which forms oxides in tetrahedral coordination with [AlO$_2$] and [PO$_2$] units, and is selected from the group consisting of magnesium, manganese, zinc, and cobalt. Such non-zeolitic molecular sieves are disclosed in, for example, U.S. Pat. No. 4,567,029, the disclosure of which is incorporated totally herein by reference.

In yet another embodiment, the present method relates to the preparation of a non-zeolitic molecular sieve comprising tetrahedrally-bound structural units comprising [M$^2$O$_2$], [AlO$_2$], and [PO$_2$] oxide units, where "M$^2$" represents at least one element which forms oxides in tetrahedral coordination with [AlO$_2$] and [PO$_2$] units and is selected from the group consisting of arsenic, beryllium, boron, chromium, cobalt, gallium, germanium, iron, lithium, magnesium, manganese, silicon, titanium, vanadium, and zinc. Molecular sieves of this type are disclosed in, for example, U.S. Pat. No. 4,913,799, the disclosure of which is incorporated totally herein by reference.

In yet another embodiment, the present method relates to the preparation of a non-zeolitic molecular sieve comprising tetrahedrally-bound structural units comprising [M$_3$O$_2$], [SiO$_2$], [AlO$_2$], and [PO$_2$] oxide units, where "M$^3$" represents an element which forms oxides in tetrahedral coordination with [AlO$_2$] and [PO$_2$] units, is characterized by a mean M$^3$—O distance in tetrahedral oxide structures between about 1.51 Angstroms and about 2.06 Angstroms, has a cation electronegativity between about 125 kcal/g-atom and about 310 kcal/g-atom, and is capable of forming stable M$^3$—O—P, M$^3$—O—Al or M$^3$—O—M$^3$ bonds in crystalline three dimensional oxide structures having an "M$_3$—O" bond dissociation energy greater than about 59 kcal/mole at 289° C. Such molecular sieves are disclosed in, for example, U.S. Pat. No. 4,973,785, the disclosure of which is incorporated totally herein by reference.

In the present process, a non-zeolitic molecular sieve is prepared by producing a dense gel comprising active sources of the molecular sieve, a templating agent and sufficient water to form the dense gel into particles. The dense gel is then maintained in a crystallization step at crystallization conditions for sufficient time to form a crystallized product comprising crystals of the molecular sieve. Prior to crystallization, the dense gel may be formed into particles, wherein at least about 50% by weight of the particles, and preferably about 80% by weight of the particles have a diameter of greater than about 0.01 inch, and more preferably in the range of about 1/64 inch to about ½ inch. The particles as prepared herein are self-supporting, i.e. they maintain their shape after being formed. It is preferred that the particles also be capable of maintaining their shape during the crystallization step. The shape of the particles is not critical to the invention, and some shapes may be preferable to others, depending on the use to which the molecular sieve is to be put. For example, the particles may be in the form of granules, produced by blending the active source of the molecular sieve, the templating agent and sufficient water to form the granules. Alternatively, the particles may have the form of, for example, rods, cylinders, extrudates, beads, spheres, pills, tablets and other similar shapes which are known to be useful in catalysis. It is an important feature of this invention that the particles are formed prior to crystallization, and that the non-zeolitic molecular sieve is crystallized from and within the particles.

The dense gel has a molar composition of oxides falling within the following ranges:

|  |  | Preferred |
| --- | --- | --- |
| $H_2O/Al_2O_3$ | 0.5–8 | 1–6 |
| $P_2O_5/Al_2O_3$ | 0.1–1.1 | 0.5–1.0 |
| $R/Al_2O_3$ | 0.1–2.0 | 0.1–1.5 |
| $M/Al_2O_3$ | 0–1 | 0–0.7, | wherein "R" is an organic templating agent and "M" represents at least one element, other than aluminum and phosphorous, which is capable of forming an oxide in tetrahedral coordination with $[AlO_2]$ and $[PO_2]$ oxide structural units in the molecular sieve, and wherein the total water includes, for example, water present in hydrated sources, water present in added aqueous solutions, and liquid water added to facilitate mixing, shaping and/or crystallization.

An organic templating agent, also known as a structure directing agent, is added to the dense gel to facilitate crystallization of the molecular sieve. Organic templating agents can be selected from those known to be effective in the synthesis of molecular sieves and zeolites. U.S. Pat. Nos. 4,710,485; 4,440,871; 4,310,440; 4,567,029; 4,686,093; and 4,913,799 include examples of suitable templating agents. The disclosure of each of these patents, particularly as relating to templating agents, is incorporated herein by reference.

In general the templating agents useful in the present invention contain elements of Group VA of the Periodic Table of Elements, particularly nitrogen, phosphorus, arsenic and antimony, preferably N or P and most preferably N. The templating agents also contain at least one alkyl or aryl group having from 1 to 8 carbon atoms. Particularly preferred nitrogen-containing compounds for use as templating agents are the amines and quaternary ammonium compounds, the latter being represented generally by the formula $R_4N^+$ wherein each R is an alkyl or aryl group containing from 1 to 8 carbon atoms. Polymeric quaternary ammonium salts such as $[(C_{14}H_{32}N_2)(OH)_2]_x$ wherein "x" has a value of at least 2 are also suitably employed. Both mono-, di- and triamines are advantageously utilized, either alone or in combination with a quaternary ammonium compound or other templating compound. Mixtures of two or more templating agents can either produce mixtures of the desired non-zeolitic molecular sieves or the more strongly directing templating species may control the course of the reaction with the other templating species serving primarily to establish the pH conditions of the reaction gel. Representative templating agents include tetramethylammonium, tetraethylammonium, tetrapropylammonium or tetrabutylammonium ions; di-n-propylamine; di-isopropylamine; tripropylamine; triethylamine, triethanolamine, piperidine; cyclohexylamine; 2-methylethanolamine; choline; $N_1N$-dimethylbenzylamine; $N_1N$-dimethylethanolamine; choline; $N_1N$-dimethylpiperazine; 1,4-diazabicyclo(2,2,2,)octane; N-methyldiethanolamine, N-methylethanolamine; N-methylpiperidine; 3-methylpiperidine; N-methylcyclohexylamine; 3-methylpyridine; 4-methylpyridine; quinuclidine; $N_1N$-dimethyl-1,4-diazabicyclo(2,2,2) octane ion; di-n-butylamine, neopentylamine; di-n-pentylamine; isopropylamine; t-butylamine; ethylenediamine; pyrolidine; and 2-imidazolidone. Not every templating agent will direct the formation of every species of NZMS, i.e., a single templating agent can, with proper manipulation of the reaction conditions, direct the formation of several NZMS compositions, and a given NZMS composition can be produced using several different templating agents.

Active sources of aluminum for the non-zeolitic molecular sieve of the present process which may be mentioned include aluminum hydroxide $Al(OH)_3$, gibbsite, boehmite $AlO(OH)$ or pseudo-boehmite, an alumina such as gamma and beta alumina, an alumina salt such as aluminum fluoride, aluminum sulphate, aluminum phosphate or sodium aluminate, or an aluminum alkoxide such as aluminum isopropoxide. Aluminum alkoxide, aluminum hydroxide and pseudo-boehmite are particularly preferred. In conventional preparations methods, excess alumina added to a reaction mixture used to prepare the molecular sieve may disrupt the crystallization, and must be recovered or discarded at the completion of crystallization. In contrast, excess alumina, added to the dense gel of the present process above that which will be incorporated into the crystalline framework of the molecular sieve, serves as an amorphous binder to the crystals, thereby imparting physical properties which may be beneficial when the crystals are used for catalytic processes.

Phosphoric acid is the preferred active source of phosphorous. However, organic phosphates such as triethyl phosphate, and crystalline aluminophosphates, such as the $AlPO_4$ composition of U.S. Pat. No. 4,310,440 are also satisfactory. Silica sol or fumed silica are preferred active sources of silicon. Silica gel and silica hydrogel, silicates, silicic acid, colloidal silica, silica hydroxides, alkoxides of silicon, and reactive solid amorphous precipitated silica are also suitable.

Elements other than phosphorous or aluminum, which are capable of forming an oxide in tetrahedral coordination with $[AlO_2]$ and $[PO_2]$ oxide structural units in a molecular sieve may be added to the dense gel in any form, and preferably as a water soluble salt, which will not be detrimental to the formation of the desired molecular sieve. The elements other than phosphorous or aluminum are preferably selected from arsenic, beryllium, boron, chromium, cobalt, gallium, germanium, iron, lithium, magnesium, manganese, silicon, titanium, vanadium, and zinc, and more preferably selected from silicon, magnesium, manganese, zinc and cobalt, and still more preferably silicon. Typical anions include chloride, fluoride, iodide, nitrate, sulfate, oxalate, and acetate.

Metals may be further added to the dense gel, to be occluded within the pores of the molecular sieve during crystallization rather than to become chemically bound in the molecular sieve lattice. The purpose of these further metals is, for example, to provide catalytic metals within the molecular sieve. A silicoaluminophosphate molecular sieve containing occluded Group VIII metals is taught in U.S. Pat. No. 4,710,485, the disclosure of which, and in particular that disclosure relating to the occluded metal compound, is incorporated herein by reference. Introduction of a compound of the metal to the molecular sieve-forming dense gel may be made by the addition of such compound to one of the reactants used in the preparation of the gel. Alternatively, the metal compound may be introduced by addition to the formed particles. It is, however, essential that the metal compound be present in the dense gel before crystallization of the molecular sieve takes place in order that crystals of the molecular sieve may grow in the presence of the metal compound.

These further metals preferably include Group VIB and Group VIII metals or mixtures thereof. Of the Group VIB metals, molybdenum and tungsten are preferred. Of the Group VIII non-platinum group metals, nickel and cobalt are preferred. The preferred Group VIII metal is a metal of the platinum series, e.g., platinum, palladium, iridium, rhodium, ruthenium, or osmium. Of this group platinum and palladium are accorded preference. These further metals serve as hydrogenation-dehydrogenation components in the catalyst prepared using the present process. The amount of metal ranges from about 0.01% to about 10% by weight of the molecular sieve, preferably from about 0.2 to about 5% by weight of the molecular sieve.

In the preparation of the molecular sieve, the active sources of the molecular sieve and one or more templating agents capable of forming the molecular sieve are combined to produce a dense gel, wherein the ratio of components of the dense gel prior to crystallization is such that the dense gel is capable of being formed into a shape, and capable of maintaining that shape. Methods known to the art of forming catalysts, such as by blending and kneading, may be employed for forming particles from the dense gel. The dense gel is a generally homogeneous solid mixture with sufficient water to form relatively dry, relatively free-flowing soft granules or coarse powder during the mixing and kneading step. Alternatively, the dense gel is in the form of one or more shapes, such as cylinders, rods, extrudates, pellets, beads, spheres, tablets, pills and the like, using methods known to the art, prior to crystallization. Sufficient water is added to the active sources during mixing and kneading to achieve the desired consistency.

The active sources included in the dense gel will generally be in the form of, for example, powders, small hydrated particles or concentrated solutions. Larger particles may require size reduction before use. A size reduction method useful in the present process can be found in, for example, U.S. Pat. No. 5,208,005, the disclosure of which, and in particular the disclosure relating to size reduction, is incorporated herein by reference. While it may be preferred for ease of processing or for other reasons, it is not critical in the present process that all of the active sources be readily soluble in water during mixing, since the water added to the active sources will be insufficient to make a fluid-like mixture.

The dense gel, optionally in the form of particles, will comprise less than about 60 percent by weight, preferably from about 20 percent to about 60 percent by weight, and more preferably from about 20 percent to about 50 percent by weight of water during crystallization. This amount of liquid is considerably less than that required in conventional processes for preparing molecular sieves. The amount of water added will depend on a number of factors, including the active sources employed, the type of mixing apparatus used, and the form of the molecular sieve desired. Those familiar with the art can readily determine without undue experimentation the amount of liquid required to properly mix active sources of the molecular sieve. For example, hydrated sources of the molecular sieve may require relatively less liquid, and dried sources may require relatively more.

This amount of water is generally sufficient both to form particles, and to crystallize the molecular sieve from and within the particles at crystallization conditions. Water may be added or removed by drying, if necessary, to form the particles prior to crystallization, and adjusted again after formation of the particles and before crystallization as necessary to achieve the required amount of water in the particles. Conventional methods for drying wet catalytic materials can be used to dry the particles, and may include, for example drying in air or an inert gas such as nitrogen or helium at temperatures below about 200° C. and at pressures from subatmospheric to about 5 atmospheres pressure.

Naturally occurring clays, e.g., bentonite, kaolin, montmorillonite, sepiolite and attapulgite, are not required, but may be included in the particles prior to crystallization to improve intraparticle diffusion and to provide particles having good crush strength. Such clays can be used in the raw state as originally mined or can be initially subjected to calcination, acid treatment or chemical modification. It is important, however, to avoid using high alkali content clays, which may interfere with crystallization. Organic binders, such as, for example, microcrystalline cellulose, have also been found to improve the physical properties of the particles. Excess alumina over that which is incorporated into the molecular sieve framework may be added to the dense gel prior to crystallization to serve as binder for the crystals.

As stated above, the liquid present in the dense gel (which may be in the form of shaped particles) may be a combination of aqueous and organic liquids, so long as the specified amount of water is present. Since the total liquid content may affect, for example, the physical strength of the shaped particles, it is preferred that the total volatiles content of the particles during crystallization be less than 60 percent by weight, preferably in the range of between about 20 and about 60 percent by weight, and more preferably between about 30 and about 50 percent by weight, where the total volatiles content is based on the total particle weight, including liquid content of the particles. It is a feature of the present process that no additional liquid beyond that required to form the particles is required for crystallization of the molecular sieve. Volatiles content of the reaction mixture may be determined by heating a sample of the mixture for up to 30 minutes or more at ambient pressure and at a temperature of up to approximately 1000° F.

Crystallization of the molecular sieve within the dense gel, which may be in the form of particles, takes place in the absence of an external liquid phase, i.e. in the absence of a liquid phase separable from the gel using routine solid-liquid physical separation methods such as by gravity filtration or decanting. In general, it is not detrimental to the present process if some liquid water is present in contact with the gel or with the shaped particles during crystallization. And it can be expected that some water may be on the surface of the gel during crystallization, for example, by wetting the surface of the gel. Indeed, it is important to maintain sufficient water within the crystallization chamber in which crystallization occurs in order to maintain an atmosphere of water vapor in contact with the gel. However, it is an objective of the present invention to provide a method of crystallizing the non-zeolitic molecular sieve in such a way as to reduce the amount of water which must be treated and/or discarded following crystallization. To that end, the present method provides a synthesis method which requires no additional water for crystallization beyond an amount of liquid required to form particles. Indeed, liquid water present during crystallization may alter the form of the particles, and, in extreme circumstances, may cause the particles to lose their integrity or to dissolve. Thus, the amount of liquid employed during crystallization is dictated largely by the requirements for forming particles from the active sources of the non-zeolitic molecular sieve, and for maintaining the shapes of the particles during crystallization.

Crystallization is conducted at an elevated temperature and usually in an autoclave so that the dense gel is subject to autogenous pressure until crystals of the NZMS are formed. The temperatures during the hydrothermal crystallization step are typically maintained from about 80° C. to about 225° C., preferably from about 90° C. to about 200° C. and more preferably from about 100° C. to about 180° C. It is an important feature of the present process that the crystallization of the NZMS is frequently accelerated relative to conventional crystallization methods. Thus, the crystallization time required to form crystals will typically range from about 1 hour to about 10 days, and more frequently from about 3 hours to about 4 days.

The resulting molecular sieve comprises a three-dimensional microporous crystal framework comprising [PO₂] and [AlO₂] tetrahedral units whose empirical formula on an anhydrous basis is:

$$aR:(M_xAl_yP_z)O_2$$

wherein "R" is an organic templating agent; "a" has a value great enough to constitute an effective concentration of "R" and is within the range of from greater than zero (0) to about 6, preferably greater than zero (0) to about 3; "M" represents at least one element, other than aluminum and phosphorous, which is capable of forming an oxide in tetrahedral coordination with [AlO₂] and [PO₂] oxide structural units in the molecular sieve; "x" represents the mole fraction of "M" and has a value of equal to or greater than zero, and "y" and "z" represent the mole fractions, respectively, of aluminum and phosphorus in the $(M_xAl_yP_z)O_2$ constituent and each of "y" and "z" has a value of at least 0.01.

Once the crystals have formed, they may be water-washed. Further, the present NZMS, when employed either as an adsorbent, ion-exchanger, or as a catalyst in an organic compound conversion process, should be dehydrated, at least partially. This can be done by heating to a temperature in the range of 200° C. to 800° C.

A further important aspect of the present process is the high yield of NZMS when using the present process. Conventional methods for preparing the NZMS, which include a separable liquid phase in the crystallization step, suffer from a significant loss of reagents in the liquid phase at the conclusion of the crystallization step. In contrast, in the present method, the yield of NZMS at the conclusion of the crystallization step, is typically at least about 50% by weight, where the yield of NZMS is determined on an anhydrous basis, as a percent of the theoretical maximum yield, based on reaction stoichiometry and on the quantities of reagents used. Indeed, by careful blending of stoichiometric ratios of reagents, yields of NZMS of at least about 70% (w/w), preferably at least about 80% (w/w), and more preferably at least about 90% (w/w) can be achieved.

The method used to determine x-ray crystallinity of the NZMS, and therefore the yield of NZMS, is an intensity comparison method similar to ASTM D 3906, "Standard Test Method for Relative Zeolite Diffraction Intensities" used for Y zeolite. D 3906 uses the peak height times the peak width at half height as an approximation to the integrated area of each peak. The method used as described herein differs from D 3906 in that the integrated area (intensity) for each peak is determined by approximating the peak shape using a mathematical profile (for example, a pseudo-Voight function). The integrated intensities based on the mathematical profile are summed and then ratioed to the same sum for a standard material.

X-ray crystallographic characterization and the conventional method of preparation of SAPO-5, SAPO-11, SAPO-31 and SAPO-39 are disclosed in, for example, U.S. Pat. No. 4,440,871, U.S. Pat. No. 4,943,424, and U.S. Pat. No. 5,087,347, the disclosure of which, and in particular the disclosure relating to the preparation and characterization of the molecular sieve materials, is incorporated herein by reference.

Prior to crystallization, the dense gel, prepared as described, comprises amorphous, non-crystalline reagents. Crystalline material (i.e. "seed" crystals) may be added prior to the crystallization step, and methods for enhancing the crystallization of molecular sieves by adding seed crystals are well known. However, the addition of seed crystals is not a requirement of the present process. Indeed, it is an important feature of the present process that the NZMS can be crystallized within the dense gel in the absence of crystals added prior to the crystallization step.

An important feature of the present process is the small crystallite size of NZMS crystals formed in the process. Since small crystals are desirable for certain catalytic applications, crystallization conditions can be tailored by, for example, reducing crystallization temperature, reducing heat-up rate at the start of crystallization, adding materials such as silica to the reaction mixture to retard crystal growth, and/or by reducing the water content of the reaction mixture prior to crystallization, to produce crystals with crystallite size of less than 1.0 micron. Careful attention to synthesis conditions may result in crystals having a crystallite size of less than 0.7 microns, and even as small as 0.5 microns or less. Crystal size may be determined by, for example, grinding the shaped particles to separate the individual crystals. High resolution scanning electron micrographs of the separated crystals are then prepared, after which the average size of individual zeolite crystals is determined by reference to calibrated length standards. An average crystal size is then computed in various well-known ways, including:

$$\text{Number Average} = \frac{\sum_{i=1}^{n} (n_i \times L_i)}{\sum_{i=1}^{n} n_i}$$

where $n_i$ is the number of zeolite crystals whose minimum length falls within an interval $L_i$. For purposes of this disclosure, average crystal size will be defined as a number average. It is important to note that for purposes of this invention, zeolite crystal size is distinguished from what some manufacturers term "particle size", the latter being the average size of all particles, including both individual crystals and polycrystalline agglomerates, in the crystallized NZMS molecular sieve powder.

The NZMS recovered from the crystallization step can be used as synthesized, can be dried or can be thermally treated (calcined). Typical calcining conditions include heating in air or inert gas at temperatures ranging from about 200° C. to 820° C. for periods of time ranging from 1 to 48 hours, or more. The NZMS can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Group VIII metals selected from the group consisting of at least one of platinum and palladium are preferred. The amount of metal ranges from about 0.01% to about 10% by weight of the molecular sieve, preferably from about 0.2% to about 5% by weight of the molecular sieve.

Hydrogen, ammonium, and the metal components can be exchanged into the zeolite. The molecular sieve can also be impregnated with the metals, or the metals can be physically intimately admixed with the molecular sieve using standard methods known to the art. Alternatively, the metals can be occluded in the crystal lattice by having the desired metals present as ions in the reaction mixture from which the molecular sieve is prepared.

The techniques of introducing catalytically active metals to a molecular sieve are disclosed in the literature, and pre-existing metal incorporation techniques and treatment of the molecular sieve to form an active catalyst such as ion exchange, impregnation or occlusion during sieve preparation are suitable for use in the present process. Such techniques are disclosed in U.S. Pat. Nos. 3,236,761; 3,226,339; 3,236,762; 3,620,960, 3,373,109, 4,202,996; 4,440,871 and 4,710,485, which are incorporated herein by reference.

The term "metal" or "active metal" as used herein means one or more metals in the elemental state or in some form such as sulfide, oxide and mixtures thereof. Regardless of the state in which the metallic component actually exists, the concentrations are computed as if they existed in the elemental state.

Following addition of the metals, the molecular sieve may be calcined in air or inert gas at temperatures ranging from about 200° C. to 820° C. for periods of time ranging from 1 to 48 hours, or more, to produce a catalytically active product especially useful in hydrocarbon conversion processes.

The non-zeolitic molecular sieve may be used as a catalyst, without additional forming, when the particles recovered from the crystallization step are of a size and shape desired for the ultimate catalyst. Alternatively, the molecular sieve can be composited with other materials resistant to the temperatures and other conditions employed in organic conversion processes, using techniques such as spray drying, extrusion, and the like. Such matrix materials include active and inactive materials and synthetic or naturally occurring zeolites as well as inorganic materials such as alumina, clays, silica and metal oxides. The latter may occur naturally or may be in the form of gelatinous precipitates, sols, or gels, including mixtures of silica and metal oxides. Use of an active material in conjunction with the synthetic molecular sieve, i.e., combined with it, tends to improve the conversion and selectivity of the catalyst in certain organic conversion processes. Inactive materials can suitably serve as diluents to control the amount of conversion in a given process so that products can be obtained economically without using other means for controlling the rate of reaction. Frequently, molecular sieve materials have been incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powders which cause problems in processing.

Naturally occurring clays which can be composited with the molecular sieve crystals include the montmorillonite and kaolin families which include the subbentonites, and the kaolins commonly known as Dixie, McNamee, Georgia, and Florida clays or others in which the main mineral constituent is halloysite, kaolinite, dickite, nacite, or an auxite. Such clays can be used in the raw state as originally mined or initially subjected to calcination, acid treatment, or chemical modification. Binders useful for compositing with the present crystal also include inorganic oxides, notably alumina or silica.

In addition to the foregoing materials, the NZMS produced can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia, silica-alumina-magnesia, and silica-magnesia-zirconia. The relative proportions of finely divided NZMS material and inorganic oxide gel matrix vary widely, with the crystal content ranging from 1 to 90% by weight and more usually, particularly when the composite is prepared in the form of beads, in the range of 2 to 80 weight percent of the composite.

Non-zeolitic molecular sieves prepared in the present process are useful for a variety of organic, e.g., hydrocarbon compound conversion processes. Hydrocarbon conversion reactions are chemical and catalytic processes in which carbon containing compounds are changed to different carbon containing compounds. Examples of hydrocarbon conversion reactions include catalytic cracking, hydrocracking, dewaxing, and olefin and aromatics formation reactions, including formation from oxygenates. The catalysts are useful in other petroleum refining and hydrocarbon conversion reactions such as isomerizing and hydroisomerizing paraffins and olefins, polymerizing and oligomerizing olefinic or acetylinic compounds such as isobutylene and pentene-1, reforming, alkylating, isomerizing polyalkyl-substituted aromatics (e.g. meta xylene), and disproportionating aromatics (e.g.toluene) to provide a mixture of benzene, xylenes and higher methylbenzenes.

EXAMPLES

Example 1

SAPO-31

Eight grams of silica (Hi-Sil 233, 92 wt % $SiO_2$, 8 wt % $H_2O$) were mixed with 56 grams of Catapal alumina (pseudo-boehmite, 73 wt % $Al_2O_3$, 27 wt % $H_2O$). Then 36 grams of di-n-propylamine were slowly mixed in, and mixed for an additional 30 minutes.

Eighty grams of peptized and neutralized Catapal alumina (using $HNO_3$ and $NH_4OH$, respectively) were prepared, which contained 35 wt % $Al_2O_3$ and 65 wt % $H_2O$. This alumina was added to the above mix and mixed for 30 minutes.

Then 92 grams of 86% $H_3PO_4$ were slowly added with mixing. The mix was then extruded through a 1/16-inch die on a Carver press and placed in a Teflon bottle in a stainless steel pressure vessel and heated at 190° C. and autogenous pressure for two days. The extrudate was washed with water and dried overnight in a vacuum oven at 120° C., then calcined in air at 593° C. for eight hours. X-ray diffraction analysis showed the extrudate to contain primarily SAPO-31.

Example 2

SAPO-11

Ninety-two grams of 86% $H_3PO_4$ were mixed with 19 grams of Catapal alumina. Next 8 grams of silica (Cab-O-Sil M-5, 91 wt % $SiO_2$, 9 wt % $H_2O$) were added along with an additional 37 grams of Catapal alumina and mixed for 15 minutes. 80 grams of peptized and neutralized Catapal alumina were then added with mixing for 15 minutes. Then 36 grams of di-n-propylamine were slowly added with mixing for an additional 15 minutes. The mix was allowed to sit for three hours in a hood, then extruded through a 1/16-inch die. Volatiles content of the extrudate was 52.4 wt %. The extrudate was placed in a Teflon bottle in a stainless steel pressure vessel and heated at 190° C. and autogenous pressure for two days. The extrudate was washed with water and dried overnight in a vacuum oven at 120° C., then calcined in air at 593° C. for eight hours. X-ray diffraction showed the extrudate to contain primarily SAPO-11 with lesser amounts of SAPO-31 and SAPO-39.

The extrudate was impregnated with 0.5 wt % platinum using an aqueous solution of Pt (NH$_3$)$_4$(NO$_3$)$_2$, dried overnight in a vacuum oven at 110° C. and calcined in air at 149° C. for two hours, 204° C. for two hours, and 288° C. for four hours.

Examples 3 and 4 show some results for lube dewaxing using the catalyst prepared in the present process.

Example 3

The catalyst of Example 2 was used to dewax a waxy hydrocracked medium neutral lube oil (Table I) at 1.0 LHSV, 1950 psig total pressure, and 8000 SCF/bbl once-through H$_2$. Results in Table II show the catalyst to produce a low pour point product at high yield and high viscosity index.

TABLE I

INSPECTIONS OF WAXY HYDROCRACKED
MEDIUM NEUTRAL LUBE OIL

| | |
|---|---|
| Gravity, API | 34.6 |
| Viscosity, 100° C., cSt | 5.596 |
| Pour Point, C | +42 |
| Nitrogen, ppm | 0.3 |
| Sulfur, ppm | <6 |
| Simulated Dist., LV %, C | |
| ST/5 | 296/379 |
| 10/30 | 397/431 |
| 50 | 454 |
| 70/90 | 476/507 |
| 95/EP | 527/567 |

TABLE II

DEWAXING HYDROCRACKED MEDIUM
NEUTRAL LUBE OIL

| Example | Solvent Dewaxing | 3 | | 4 |
|---|---|---|---|---|
| LHSV | | 1.0 | 1.3 | 1.3 |
| Temp, F. | | 688 | 682 | 675 |
| Lube Yield, LV % | 83.1 | 85.5 | 88.2 | 90.9 |
| 700 F+ Yield, Wt % | | 84.9 | 88.7 | 91.2 |
| Pour Point, C | −15 | −19 | −10 | −10 |
| Cloud Point, C | −14 | −18 | −9 | −4 |
| Viscosity at 40° C., cSt | 32.72 | 31.96 | 34.40 | 33.07 |
| Viscosity at 100° C., cSt | 5.789 | 5.758 | 6.072 | 5.949 |
| VI | 120 | 123 | 124 | 126 |
| Simulated Distillation, D2887, LV %, C | | | | |
| St/5 | 313/379 | 339/385 | 360/398 | 317/393 |
| 10/30 | 398/435 | 397/427 | 411/438 | 393/436 |
| 50 | 459 | 441 | 457 | 457 |
| 70/90 | 482/519 | 469/501 | 478/509 | 477/507 |
| 95/EP | 538/577 | 519/563 | 527/566 | 525/565 |

Example 4

A catalyst was made similar to that of Example 2 and used to dewax the lube oil of Table I at 1.3 LHSV, 1950 psig total pressure, and 8000 SCF/bbl H$_2$. Results are given in Table II.

Example 5

SAPO-39

Ninety-two grams of 86% H$_3$PO$_4$ were mixed with 19 grams of Catapal alumina for 10 minutes. Eight grams of Cab-O-Sil silica were added along with 80 grams of peptized and neutralized Catapal alumina (35 wt % Al$_2$O$_3$, 65 wt % H$_2$O) and mixed for 3.5 hours. An additional 5 grams of Catapal alumina were added with mixing followed by 45 grams of di-n-propylamine. The mix was then extruded through a 1/16-inch die. Volatiles content of the extrudate was 51.2 wt %. The extrudate was placed in a Teflon bottle in a stainless steel pressure vessel and heated at 190° C. and autogenous pressure for 24 hours. The extrudate was washed with water, dried in a vacuum oven overnight at 120° C., and then calcined in air for seven hours at 600° C. X-ray diffraction analysis showed the extrudate to consist almost entirely of SAPO-39.

Example 5 shows that when only di-n-propylamine is used as a templating agent, a substantial amount of the small pore SAPO-39 is formed.

Example 6

SAPO-11

To 100 grams Al(OH)$_3$ (Reheis F2000, 53 wt % Al$_2$O$_3$, 47 wt % H$_2$O) were added 10 grams of water and 112 grams of 86% H$_3$PO$_4$ slowly with mixing. Mixing continued for another 30 minutes. Ten grams of Cab-O-Sil silica and 20 grams of peptized and neutralized Catapal alumina (35 wt % Al$_2$O$_3$, 65 wt % H$_2$O) were added and mixed for 1.5 hours. To this were slowly added 27 grams of di-n-propylamine and 9 grams of di-iso-propylamine. Another 10 grams of water were added with additional mixing. The mix was extruded through a 1/16-inch die. Volatiles content of the extrudate was 46.0 wt %. The extrudate was placed in a Teflon bottle in a stainless steel pressure vessel and heated at 180° C. and autogenous pressure for two days. The extrudate was washed with water, dried overnight in a vacuum oven at 120° C. and then calcined in air for eight hours at 593° C. X-ray diffraction analysis showed the extrudate to contain almost exclusively SAPO-11.

Example 6 shows that by adjusting the ratio of di-n-propylamine and di-isopropylamine templating agents, SAPO-11 can be formed exclusively.

Example 7

SAPO-5/SAPO-11

To 112 grams of 86% H$_3$PO$_4$ were added 30 grams of Reheis Al(OH)$_3$ and mixed for 30 minutes. An additional 50 grams of Reheis Al(OH)$_3$ were then added along with 10 grams of Cab-O-Sil silica and mixed for 30 minutes. Twenty more grams of Reheis Al(OH)$_3$ were then added followed by 36 grams of di-isopropylamine slowly with mixing. Sixty grams of water were then added with mixing and the mix extruded through a 1/16-inch die. Volatiles content of the extrudate was 51.9 wt %. The extrudate was placed in a Teflon bottle in a stainless steel pressure vessel and heated at 190° C. and autogenous pressure for two days. The extrudate was then washed with water, dried in a vacuum oven at 120° C. overnight, and calcined in air at 593° C. for eight hours. X-ray diffraction analysis showed the extrudate to contain SAPO-11 and SAPO-5 at a ratio of about 3/1. Example 7 shows that when only di-isopropylamine is used as the templating agent, a substantial amount of the large pore SAPO-5 is formed.

What is claimed is:

1. A process for preparing a non-zeolitic molecular sieve comprising:

a. producing particles comprising:
   i. at least one active source of phosphorous,
   ii. at least one active source of alumina,
   iii. an organic templating agent capable of forming the molecular sieve, and
   iv. sufficient water to make the particles; and
b. maintaining the particles at crystallization conditions for sufficient time to form a crystallized product comprising crystals of the molecular sieve.

2. The process according to claim 1 wherein the particles, prior to crystallization, have a molar concentration in terms of oxides falling within the following ranges:

| | |
|---|---|
| $H_2O/Al_2O_3$ | 0.5–8 |
| $P_2O_5/Al_2O_3$ | 0.1–1.1 |
| $R/Al_2O_3$ | 0.1–2.0 |
| $M/Al_2O_3$ | 0–1 | wherein "R" is an organic templating agent capable of forming the non-zeolitic molecular sieve and "M" represents at least one element, other than aluminum and phosphorous, which is capable of forming an oxide in tetrahedral coordination with $[AlO_2]$ and $[PO_2]$ oxide structural units in the molecular sieve.

3. The process according to claim 2 wherein the particles have a molar composition of oxides falling within the following ranges:

| | |
|---|---|
| $H_2O/Al_2O_3$ | 1–6 |
| $P_2O_5/Al_2O_3$ | 0.5–1.0 |
| $R/Al_2O_3$ | 0.1–1.5 |
| $M/Al_2O_3$ | 0–0.7. |

4. The process according to claim 2 wherein element "M" is selected from the group consisting of arsenic, beryllium, boron, chromium, cobalt, gallium, germanium, iron, lithium, magnesium, manganese, silicon, titanium, vanadium, and zinc.

5. The process according to claim 2 wherein element "M" is silicon.

6. The process according to claim 1 wherein the yield of the molecular sieve is at least about 50% by weight.

7. The process according to claim 1 wherein the yield of the molecular sieve is at least about 70% by weight.

8. The process according to claim 1 wherein the particles, prior to crystallization, contain no added seed crystals.

9. The process according to claim 1 wherein the particles during crystallization have a total volatiles content of less than about 60 percent by weight.

10. The process according to claim 1 wherein the particles during crystallization have a total volatiles content in the range of between about 20 percent and about 60 percent by weight.

11. The process according to claim 1 wherein the active source of alumina is $Al(OH)_3$, pseudo-boehmite or a mixture thereof.

12. The process according to claim 1 wherein the organic templating agent is di-n-propylamine, di-isopropylamine or a mixture thereof.

13. The process according to claim 1 wherein at least about 50% by weight of the particles are greater than about 0.01 inches in diameter.

14. The process according to claim 1 wherein at least about 50% by weight of the particles are in the range of about 1/64 inch to about 1/2 inch in diameter.

15. The process according to claim 13 wherein the particles are in the form of one or more of rods, cylinders, extrudates, pellets, beads, spheres, pills, tablets, granules, or agglomerates.

16. The process according to claim 1 wherein the molecular sieve is SAPO-5.

17. The process according to claim 1 wherein the molecular sieve is SAPO-11.

18. The process according to claim 1 wherein the molecular sieve is SAPO-31.

19. The process according to claim 1 wherein the molecular sieve is SAPO-39.

20. The process according to claim 1 wherein the non-zeolitic molecular sieve has the following empirical formula on an anhydrous basis in terms of molar ratios of elements:

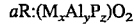

$$aR:(M_xAl_yP_z)O_2$$

wherein "R" represents an organic templating agent; "a" has a value great enough to constitute an effective concentration of "R" and is within the range of from greater than zero (0) to about 6; "M" represents at least one element other than aluminum and phosphorous capable of forming an oxide in tetrahedral coordination with $[AlO_2]$ and $[PO_2]$ oxide structural units; "x" represents the mole fraction of "M" and has a value of equal to or greater than zero; and "y" and "z" represent the mole fractions, respectively, of aluminum and phosphorus in the $(M_xAl_yP_z)O_2$ constituent and each of "y" and "z" has a value of at least 0.01.

21. A process for preparing a non-zeolitic molecular sieve comprising:
   a. producing a self-supporting gel comprising:
      i. at least one active source of phosphorous,
      ii. at least one active source of alumina,
      iii. an organic templating agent capable of forming the molecular sieve,
      iv. sufficient water to form the self-supporting gel into particles;
   b. forming the self-supporting gel into particles;
   c. maintaining the self-supporting gel particles at crystallization conditions for sufficient time to form a crystallized product comprising crystals of the molecular sieve.

22. The process according to claim 21 wherein at least about 50% by weight of the particles are greater than about 0.01 inches in diameter.

23. The process according to claim 21 wherein at least about 50% by weight of the particles are in the range of about 1/64 inch to about 1/2 inch in diameter.

24. The process according to claim 21 wherein the particles are in the form of one or more of rods, cylinders, extrudates, pellets, beads, spheres, pills, tablets, granules, or agglomerates.

25. A process for producing a non-zeolitic molecular sieve comprising:
   a. producing a self-supporting gel comprising:
      i. at least one active source of phosphorous,
      ii. at least one active source of alumina,
      iii. an organic templating agent capable of forming the molecular sieve, and
      iv. water;
   b. forming the self-supporting gel into a shape; and
   c. maintaining the self-supporting gel at crystallization conditions for sufficient time to form a crystallized product comprising crystals of the molecular sieve, wherein the ratio of components of the self-supporting gel prior to crystallization is such that the self-supporting gel is capable of being formed into a shape, and capable of maintaining that shape.

26. The process according to claim 25 wherein the self-supporting gel during crystallization have a total volatiles content of less than about 60 percent by weight.

27. The process according to claim 25 wherein the self-supporting gel during crystallization has a total volatiles content in the range of between about 20 percent and about 60 percent by weight.

28. The process according to claim 25 wherein the active source of alumina is $Al(OH)_3$, pseudo-boehmite or a mixture thereof.

29. The process according to claim 25 wherein the organic templating agent is di-n-propylamine, di-isopropylamine or a mixture thereof.

30. The process according to claim 25 wherein at least about 50% by weight of the self-supporting gel is in the form of particles having a diameter greater than about 0.01 inches.

31. The process according to claim 30 wherein at least about 50% by weight of the particles are in the range of about 1/64 inch to about 1/2 inch in diameter.

32. The process according to claim 30 wherein the particles are in the form of one or more of rods, cylinders, extrudates, pellets, beads, spheres, pills, tablets, granules, or agglomerates.

* * * * *